United States Patent Office 3,396,891
Patented Aug. 13, 1968

3,396,891
APPARATUS FOR FEEDING A WELDING ELECTRODE OF QUADRANGULAR CROSS-SECTION
Cornelis Pieter de Jong and Hendrikus Johannes Kanters, Eindhoven, Netherlands, assignors to North American Philips Company, Inc., New York, N.Y., a corporation of Delaware
Filed Oct. 26, 1966, Ser. No. 589,561
Claims priority, application Netherlands, Nov. 13, 1965, 6514776
3 Claims. (Cl. 226—184)

ABSTRACT OF THE DISCLOSURE

A welding electrode of quadrangular cross-section. A driving means for the electrode is a set of spaced, opposed rollers having V-shaped, roughened grooves facing each other and engaging the sides of the welding electrode. The grooves each have openings in the bottom so that the corners of the electrode do not engage the rollers.

---

The invention relates to an apparatus for electric arc welding having a wire-shaped welding electrode of quadrangular and preferably square cross-section, which apparatus is provided with a device for driving the welding electrode so that it can be pushed to the welding area via a guiding tube having a cylindrical inner wall and a welding nozzle, a welding torch or a welding gun, the device for driving the electrode including at least one set of rollers adapted to be pressed towards one another, at least one of which rollers is a driven roller. Such an apparatus, with which a welding electrode in the form of a tubular envelope of square cross-section the corners of which may be rounded off and which is filled with pulverulent auxiliary substances can be processed, is known.

In the known apparatus for electric arc welding, the welding electrode is passed between a set of cylindrical driving rollers. The driving force is obtained in that the rollers are firmly urged one against the other with the interposition of the electrode. It has been found that with the use of the known welding apparatus, the pressure force between the driving rollers for obtaining the force required for pushing the electrode through the cylindrical guide is limited; the greater the pressure force is, the greater is the risk of the longitudinal ribs of the welding electrode being damaged. It has been found that a welding electrode the longitudinal ribs of which are damaged can be pushed only with difficulty through a guiding tube of cylindrical cross-section.

The invention has for its object to provide means which require on the one hand only a comparatively small pressure force between the rollers and which on the other hand ensure a smooth propulsion of the welding electrode through the guiding tube.

The apparatus in accordance with the invention is characterized in that at least the driven roller has at its circumference at least one continuous V-shaped groove whose flanks, which co-operate with the side faces of the welding electrodes, have a rough surface, while in or in the proximity of the bottom of the groove these flanks are shaped so that the longitudinal ribs, which afterwards get into touch with the cylindrical inner wall of the guiding tube, remain untouched between the driving rollers.

Due to the chosen shape of the driving rollers, the welding electrode is more or less damaged by the rough flank surface of the V-shaped grooves, which does not interfere, however, with the propulsion of the welding electrode through the cylindrical guiding tube, since during the travel of the electrode between the rollers its longitudinal ribs have remained untouched.

The surface of the flanks of the V-shaped grooves may be roughened in various ways. For example, a plurality of scratches or notches or even a plurality of small protuberances may be provided on the surface. An embodiment is preferably used, however, in which the flank surfaces of the V-shaped grooves are roughened by means of a milling process.

The invention will be briefly described with reference to the diagrammatic drawing, in which.

Figure 1:
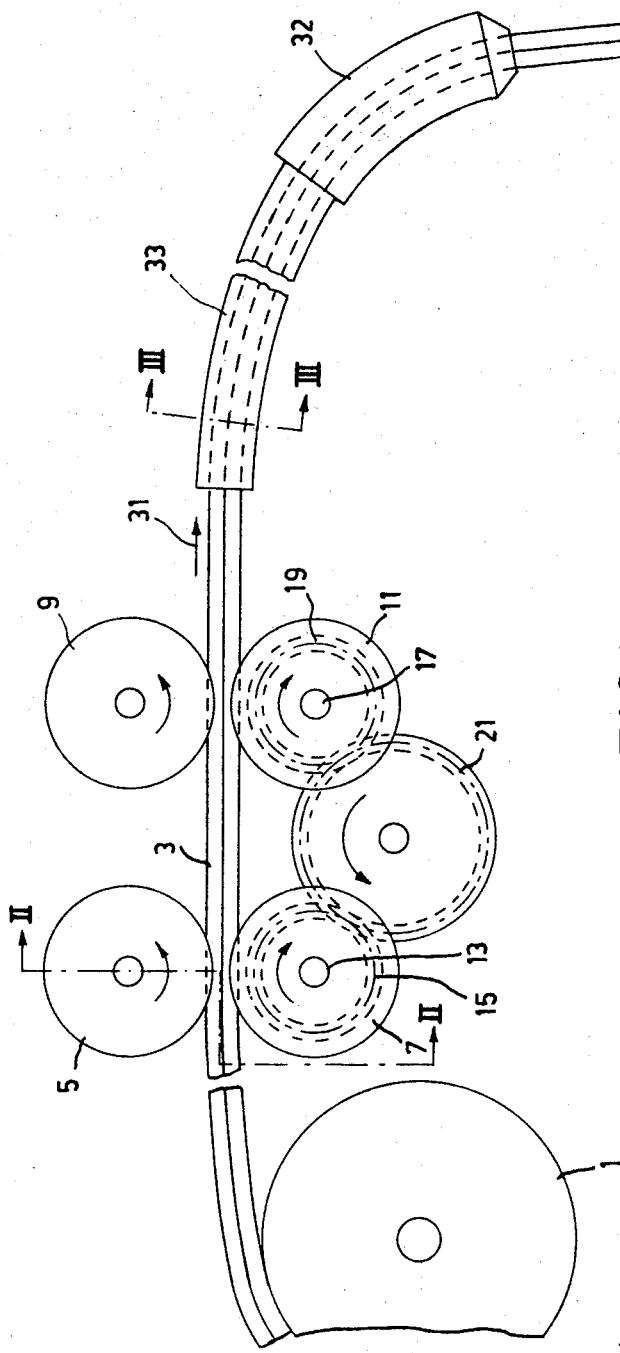
FIG. 1 shows a diagrammatic arrangement of a welding apparatus.

A welding electrode 3 supplied from a supply reel 1 passes in FIG. 1 from the left to the right along pairs of pressure rollers 5, 7 and 9, 11. The pressure roller 7 rotates about a shaft 13. A toothed wheel 15 secured to the roller 7 likewise rotates about the same shaft. The pressure roller 11 is adapted to rotate about the shaft 17; a toothed wheel 19 also rotates about this shaft and is connected to the roller 11. The toothed wheels 15 and 19 are identical and are driven by a toothed wheel 21 which in the given situation rotates counterclockwise so that the toothed wheels 15 and 19 rotate clockwise with the same speed.

Figures 2, 3:
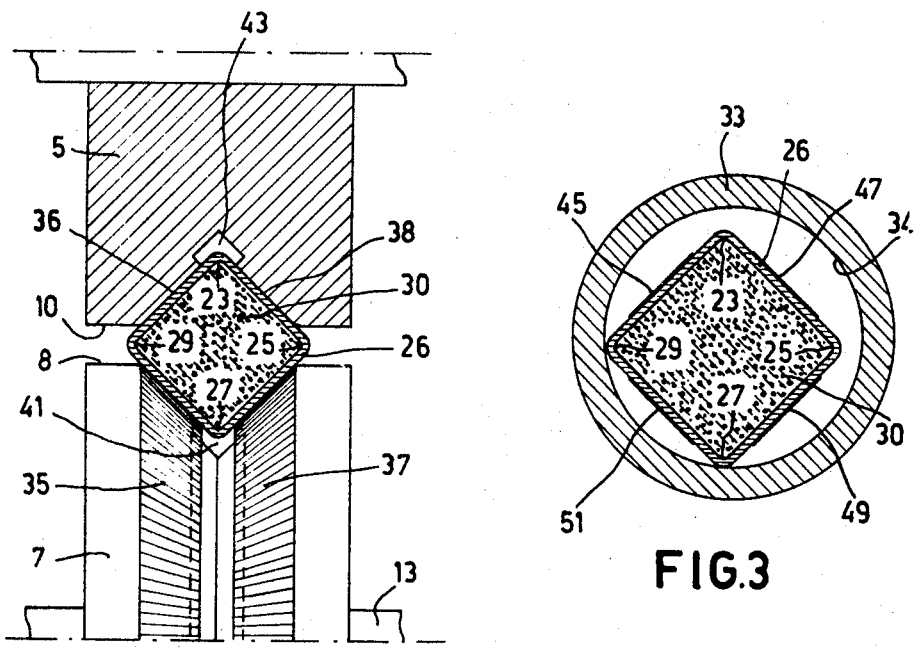
FIG. 2 is an elevation of a set of driving rollers taken on the arrows II—II of FIG. 1.
FIG. 3 is a cross-sectional view of the guiding tube of the welding apparatus taken on the arrows III—III of FIG. 1, and FIG. 4 relates to a modification of the rollers used in FIG. 2.

FIG. 2 shows a set of rollers 5, 7. These rollers are each provided at their circumferential faces 8 and 10, respectively, with a V-shaped groove. The grooves together constitute a profile for the welding electrode 3 which in this case consists of a square metal envelope 26 having rounded-off corners 23, 25, 27 and 29 and which contains a pulverulent filling 30 of auxiliary substances. Due to the rounding-off of the corners of the square cross-section, this welding electrode consequently has a number of longitudinal ribs which are not sharp but which extend at the relevant corners along a given width.

The welding electrode 3 is taken along by the pairs of rollers 5, 7 and 9, 11 if the rollers 5 and 9 are pressed against the rollers 7 and 11 with a sufficiently great force. For this purpose, known structures may be used in which the relevant rollers are pressed against each other by spring action. The welding electrode 3 is pushed in the direction of the arrow 31 through a guiding tube 33 and a welding nozzle 32 and is then conducted to the welding area. The guiding tube 33 (cf. FIG. 3) has a round cross-section and its inner wall 34 constitutes a guiding for the welding electrode 3 at a number of its longitudinal ribs. In the embodiment shown in FIG. 3, there are two points of contact. The guiding tube generally has an arbitrary curved course so that not always the same two ribs are in contact with the inner wall of the tube at successive points in the longitudinal direction of this tube 33.

As already stated, the rollers of FIG. 2 each have a V-shaped groove. The groove flanks denoted by 35, 36, 37 and 38 are milled and co-operate with the side faces of the electrode between the longitudinal ribs 23, 25, 27, 29. In the proximity of the bottoms of the V-shaped grooves, the said flanks exhibit sunken parts 41 and 43. Due to this design, the relevant ribs of the electrode will remain untouched during their travel between the rollers 5 and 7 so that they cannot be damaged either. Thus, it is ensured that the welding electrode can be readily displaced in the guiding tube 33; the side faces 45, 47, 49, 51 of the electrode, which are damaged due to the co-operation with the milled flanks of the V-shaped grooves, do not get into contact with the inner wall of the guiding tube 33.

Figure 4:
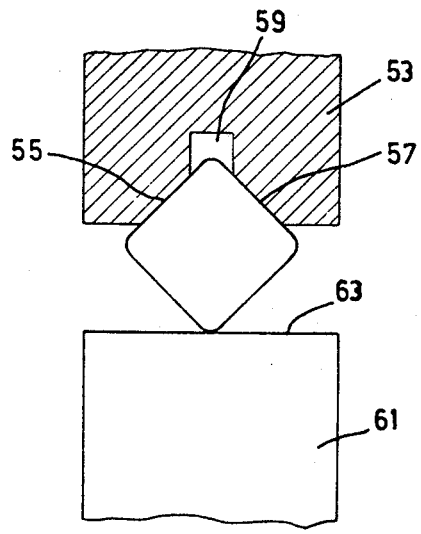

FIG. 4 shows a modification of FIG. 2. In one roller 53, the sunken bottom part of the V-shaped grooving having milled flanks 55, 57 takes the form of a slot 59; the other roller 61 has a smooth outer circumference 63 without a V-shaped groove.

It has been found that, when driving rollers are used which are provided with milled flanks in the manner shown, a comparatively small pressure force between the rollers is sufficient while nevertheless a great driving force for pushing the electrode through the guiding tube 33 can be obtained.

In the embodiments described, the driving rollers had only one continuous V-shaped groove. It should be appreciated that the invention may also be used for driving rollers along whose circumference several adjacent V-shaped grooves are disposed for simultaneously propelling more than one welding electrode of square cross-section.

What is claimed is:

1. An electric arc welding apparatus provided with an elongated welding electrode of quadrangular cross-section and longitudinal ribs on the corners of said electrode comprising means for driving said welding electrode, a guide tube having a substantially cylindrical inner wall, a welding nozzle operatively connected to said guide tube, said driving means including a set of spaced, opposed rollers, each of said rollers having a contiinuous V-shaped groove facing each other, the flanks of at least two of said V-shaped grooves being provided with a roughened surface, an opening in the bottom of each V-shaped groove whereby when said welding electrode is positioned with its side surfaces abutting the flanks of said V-shaped grooves the longitudinal ribs of said welding electrode do not engage said rollers but at least two of said longitudinal ribs engage a part of the cylindrical inner wall of said guide tube.

2. An electric arc welding apparatus as claimed in claim 1 wherein said roughened surface is formed by milling.

3. An electric arc welding apparatus as claimed in claim 1 wherein viewed in the tangential direction of the respective roller the bisector of said V-shaped groove is substantially at right angles to the axis of rotation of said roller.

References Cited

UNITED STATES PATENTS

| 832,725 | 10/1906 | Eynon et al. | 226—181 X |
| 3,078,074 | 2/1963 | Benedict | 226—193 X |
| 3,317,779 | 5/1967 | Henderson | 219—130 X |

FOREIGN PATENTS

| 1,172,201 | 2/1959 | France. |
| 426,845 | 3/1926 | Germany. |

ALLEN N. KNOWLES, *Primary Examiner.*